(12) United States Patent
Kalm et al.

(10) Patent No.: US 11,130,242 B1
(45) Date of Patent: Sep. 28, 2021

(54) CONTAINER TRANSPORTER

(71) Applicant: Amazon Technologies, Inc., Seattle, WA (US)

(72) Inventors: William Scott Kalm, Seattle, WA (US); Kushal Patel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 16/751,084

(22) Filed: Jan. 23, 2020

(51) Int. Cl.
| | |
|---|---|
| *B25J 15/00* | (2006.01) |
| *B25J 19/02* | (2006.01) |
| *B25J 15/06* | (2006.01) |
| *B65G 41/00* | (2006.01) |
| *B65G 1/04* | (2006.01) |

(52) U.S. Cl.
CPC ....... *B25J 15/0033* (2013.01); *B25J 15/0616* (2013.01); *B25J 19/023* (2013.01); *B65G 1/04* (2013.01); *B65G 41/005* (2013.01); *B65G 2203/0258* (2013.01); *B65G 2203/041* (2013.01); *B65G 2203/044* (2013.01)

(58) Field of Classification Search
None
See application file for complete search history.

(56) References Cited

U.S. PATENT DOCUMENTS

| | | | | |
|---|---|---|---|---|
| 5,129,777 A | * | 7/1992 | Pohjonen | B65G 1/0435 414/225.01 |
| 5,380,139 A | * | 1/1995 | Pohjonen | B65G 1/0435 414/273 |
| 10,000,336 B2 | * | 6/2018 | Poulin | B65G 1/0435 |
| 2009/0074546 A1 | * | 3/2009 | Christensen | B65G 41/002 414/298 |
| 2018/0118476 A1 | * | 5/2018 | Bastian, II | B65G 41/001 |
| 2020/0238505 A1 | * | 7/2020 | Parks, II | B25J 19/002 |
| 2020/0316787 A1 | * | 10/2020 | Fujihara | B25J 9/1612 |
| 2020/0377317 A1 | * | 12/2020 | Zoghzoghy | B65G 67/08 |

FOREIGN PATENT DOCUMENTS

| | | | | | |
|---|---|---|---|---|---|
| JP | 2020028951 A | * | 2/2020 | | B25J 15/00 |
| JP | 2020168700 A | * | 10/2020 | | B25J 15/06 |
| JP | 2020171982 A | * | 10/2020 | | B25J 15/08 |

* cited by examiner

*Primary Examiner* — Gerald McClain
(74) *Attorney, Agent, or Firm* — Kilpatrick Townsend & Stockton LLP

(57) ABSTRACT

A container transport can receive and move a container between positions along a container passage defined by the container transport. The container transport can include a manipulation device for engaging with the container and moving the container onto a conveyance surface of the container transport. The conveyance surface can convey the container along the container passage, and the manipulation device can move the container off of the conveyance surface.

10 Claims, 12 Drawing Sheets

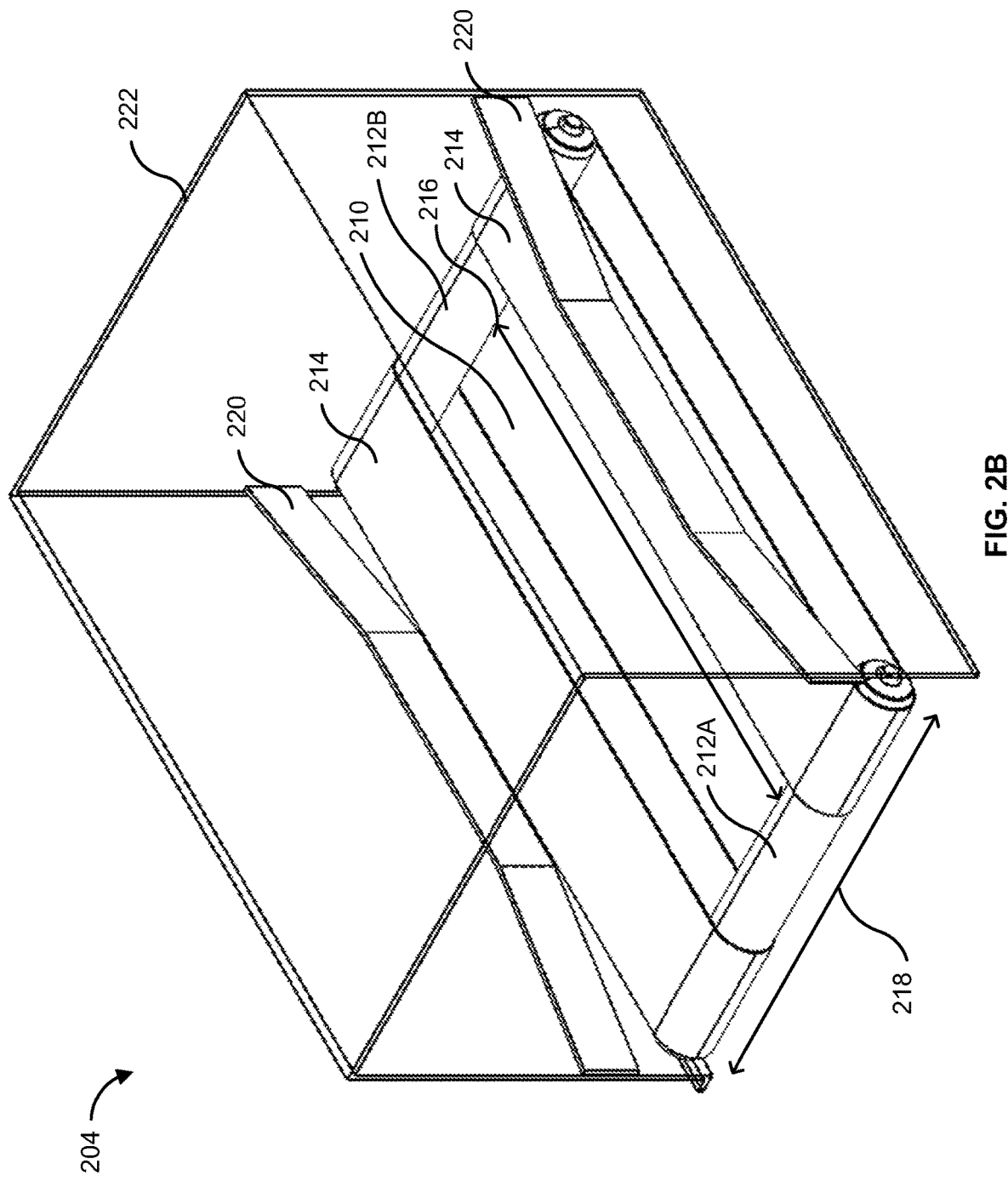

CONTAINER TRANSPORTER

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space and equipment can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which:

FIG. 2B illustrates an example container conveyance assembly that can be included in particular embodiments of the container transport of FIG. 2A;

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a container management system for moving and managing containers. The techniques described herein may be implemented by any suitable container management system, but particular examples are described that include a container transport. The container transport may include a container conveyor and a container manipulator for engaging with and moving the containers onto or off of the container transport. The techniques described herein may include automation of portions of a process for receiving, moving, and depositing a container.

Turning now to a particular example, in this example, a container transport can include a support platform that may be connected to a robotic manipulator (e.g., a robot arm). The robotic manipulator can position the container transport for engaging with a container and loading that container onto the container transport. A container manipulator (e.g., an actuatable rod with a vacuum-based end effector) may be mounted to the container transport. The container manipulator can engage with the container (e.g., via suction) and move in order to position the container on the container transport, for example, on a container conveyor such as a belt or set of rollers. The container transport may move the container via the container conveyor to a position where the container is completely or almost completely on the container conveyor. The container conveyor can hold the container in place while the robotic manipulator moves the container transport to a position for unloading the container. The container conveyor may unload the container onto an unloading station via the container conveyor and/or the container manipulator. For example, during operation, after the container manipulator has pulled a front side of the container to reach engagement with the container conveyor, the container manipulator may drop down underneath and/or through the container conveyor and pop up on a rear side of the container to assist the container conveyor in unloading the container out of the container transport.

Figure 1:
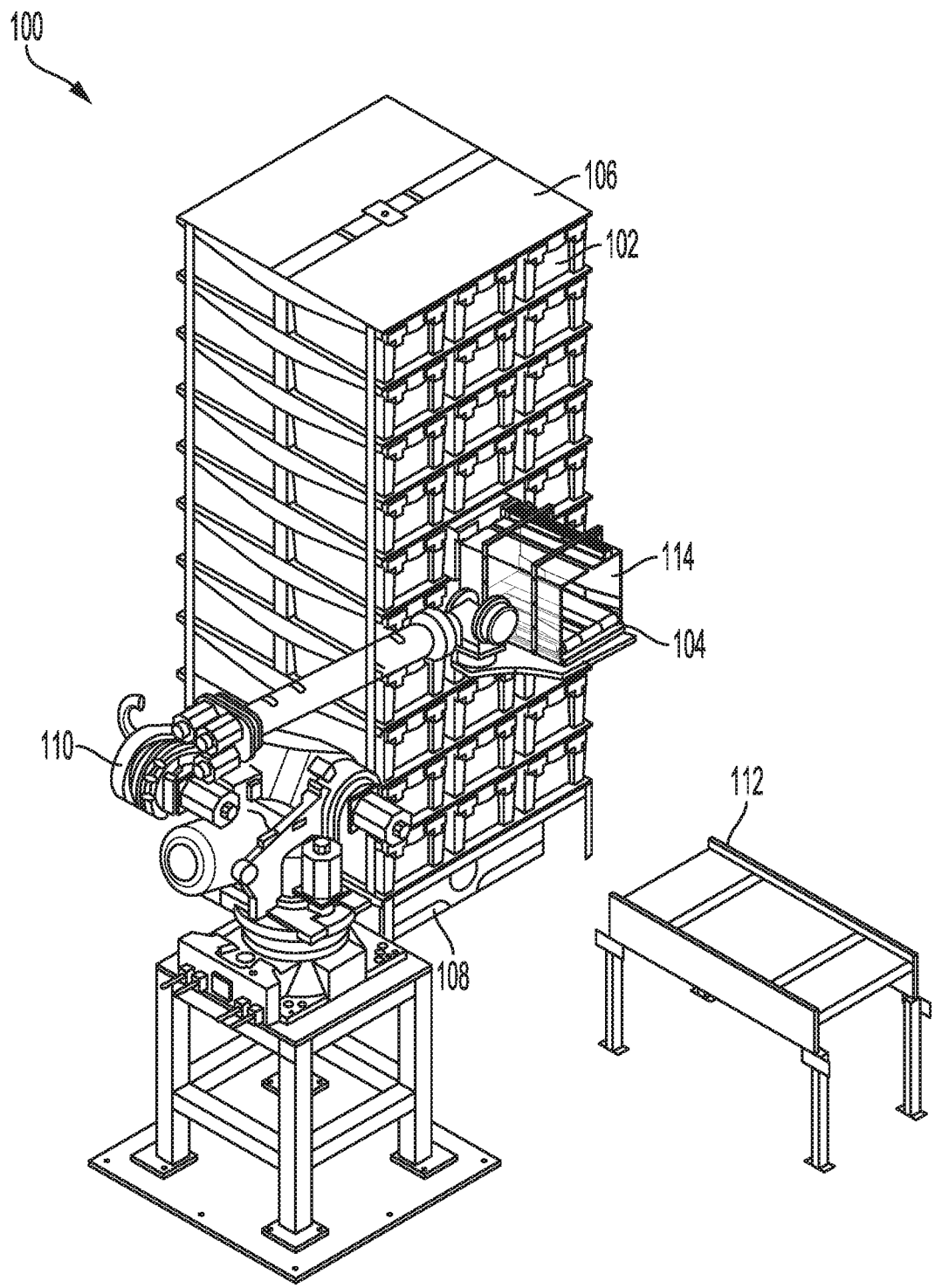
FIG. 1 illustrates a container management system, in accordance with embodiments, for moving and managing containers.

Turning now to the figures, FIG. 1 illustrates a container management system 100 for moving and managing containers 102 using a container transport 104, according to at least one example. As described herein, containers 102 can be positioned in an container holder 106. The container holder 106 can be moved around a warehouse environment via a mobile drive unit 108, for example. The mobile drive unit 108 can move the container holder 106 to a position for removal of the containers 102, for example, by the container transport 104 attached to a robotic manipulator 110. The container transport 104 can include various components for engaging with and moving the containers 102. The robotic manipulator 110 can position the container transport 104 for loading of a container 102 onto the container transport and move the container and the container transport to a position for unloading the container. The container 102 may pass at least partially through a container passage 114. For example, the container 102 can be received by a first side (e.g., the front) of the container passage 114, pass through the container passage, and exit through a second side (e.g., the rear) of the container passage. However, in some instances, a portion of the container 102 may be partially or fully received by the first side. At least a portion of the container received by the first side may exit back through the first side, e.g., such that the container is partially received by the container passage or travels within the container passage without passing through the entirety of the container passage or without passing through an opposite side. The container passage 114 can include one or more of a front, a rear, a top, one or more sides, and a bottom. The container passage 114 may be at least partially defined by a shell and/or a similar casing. The container 102 may be unloaded onto an output station 112 or a device for movement or other processing of the container.

The containers 102 can be or include a container or a bin with an interior area for containing one or more items. The containers 102 may include rigid or semi-rigid material, for example, plastic, cardboard, paper, or any suitable material for containing items. In some embodiments, the containers 102 can include handles, hooks, engagement surfaces, suctionable surfaces, or other features and/or components for engaging with the container transport 104. In further embodiments, the containers 102 may be items, e.g., such that the items are moved by the container transport 104 without first being positioned in a container 102.

Multiple containers 102 can be positioned in the container holder 106. The container holder 106 can include one or more faces for receiving containers 102. The faces can include shelves, walls, compartments, and/or rails for receiving the containers 102. For example, the faces can be positioned in the container holder 106 to arrange containers 102 into vertical columns and/or horizontal rows.

The container holder 106 can be moved by a mobile drive unit 108 around the warehouse environment in some embodiments, although the container holder 106 may additionally or alternatively include or be accompanied by a propulsion system or other system to move the container holder 106. The mobile drive unit 108 can include a propulsion system and engagement components for engaging with the container holder 106. The engagement components can engage with the container holder 106 for movement of the container holder, for example, by lifting the container holder. The mobile drive unit 108 can be manually controlled to move the container holder 106 or can include components for automated movement. For example, the mobile drive unit 108 can include components to automatically move toward and engage with an container holder 106 and move the container holder into a suitable position for interaction with the robotic manipulator 110.

The mobile drive unit 108 can position the container holder 106 near the robotic manipulator 110 for moving, removing, and/or depositing containers 102 relative to the container holder. The robotic manipulator 110 can be or include a robotic arm moveable along multiple axes. For example, the robotic arm can be moveable along six-axes, although any other suitable number greater than or less than six could alternatively be utilized. The robotic manipulator 110 can include one or more attachment points and/or engagement components for attaching to various components. For example, the robotic manipulator 110 can attach to the container transport 104.

In some embodiments, the robotic manipulator 110 can be positioned at a stationary point in a warehouse environment. However, the robotic manipulator 110 may be moveable around the warehouse environment, either under its own power and/or under the power of another device.

The robotic manipulator 110 can move the container transport 104 between a position at or near the container holder 106 and a position at or near the output station 112 or other feature for receiving the container 102. The output station 112 can receive the container 102 for further processing. For example, items can be added and/or removed from the container 102. The output station 112 can be or include a conveyor, motor driven rollers, a processing station for the containers 102, a station for adding and/or removing items, a station for manual handling of the containers, and/or any suitable component or components for handling one or more containers. The output station 112 can receive the containers 102 from the container transport 104 and move the containers to a position in a warehouse environment. For example, the output station 112 can move the containers 102 for further processing. The output station 112 can be or include motor driven rollers, belts, and/or other components suitable for moving containers 102.

Figure 2A:
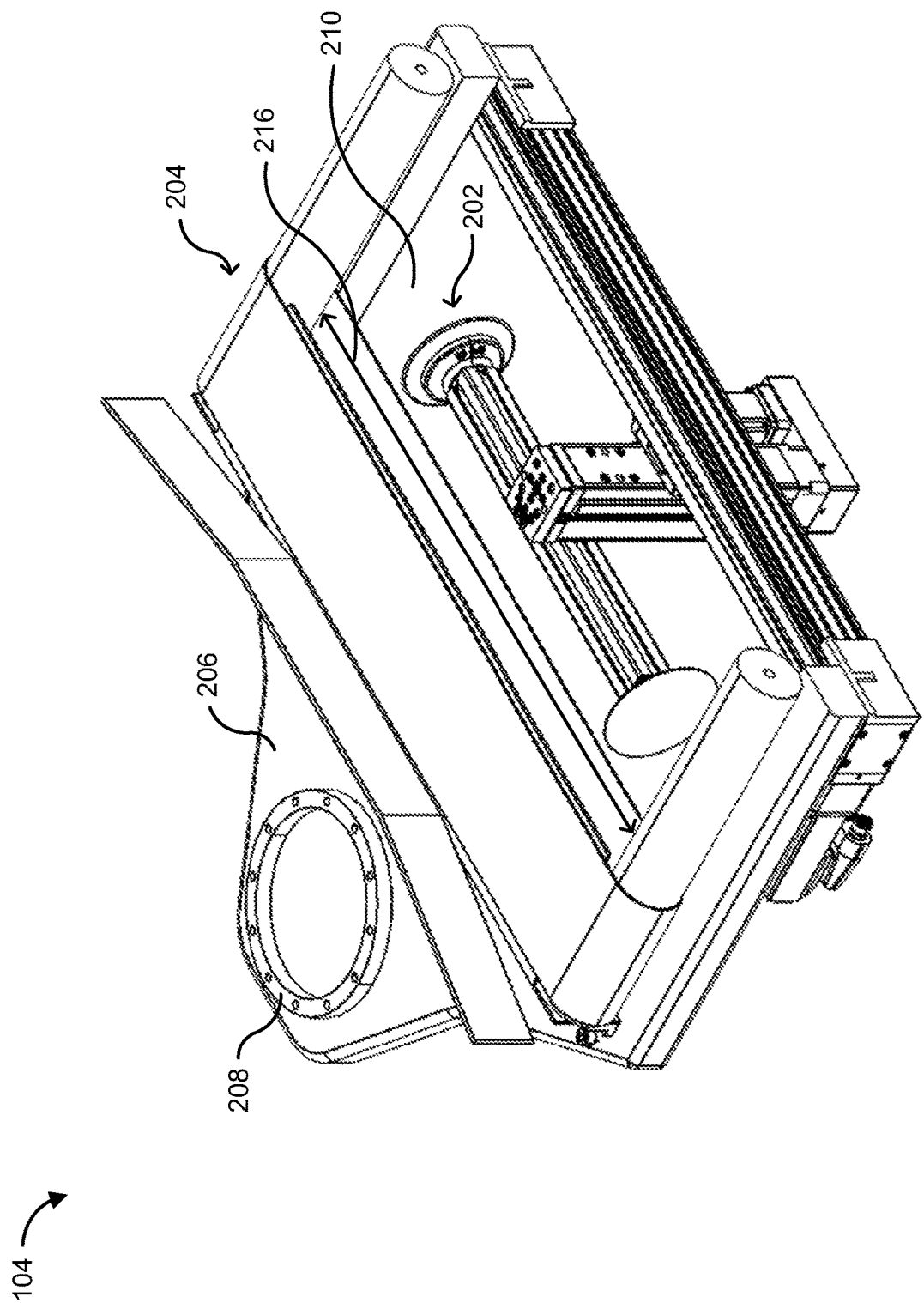
FIG. 2A illustrates a cross-sectional view of a portion of an example container transport that can be included in particular embodiments of the container management system of FIG. 1.

Turning to FIG. 2A, a cross-sectional view of a portion of an example container transport 104 that can be included in particular embodiments of the container management system 100 of FIG. 1 is shown. The container transport 104 can include a container manipulation assembly 202 and a container conveyance assembly 204. The container manipulation assembly 202 can engage with a container 102 and position the container on or otherwise in engagement with the container conveyance assembly 204 for conveyance along the container transport 104. The container manipulation assembly 202 and the container conveyance assembly 204 can be mounted to a support platform 206. The support platform 206 can include one or more openings 210 to allow movement of the container manipulation assembly 202 and/or the container conveyance assembly 204. For example, the opening 210 can allow the container manipulation assembly 202 to move out of the way of the container 102 when the container is on the container conveyance assembly 204. However, the container manipulation assembly 202 may be mounted above and/or to the side of the container conveyance assembly 204. As an illustrative example, the container manipulation assembly 202 can move vertically downward in the opening 210 to a position below the container conveyance assembly 204. When the container manipulation assembly 202 is below the container conveyance assembly 204 the container manipulation assembly can move laterally within the opening 210. Additionally or alternatively, the container manipulation assembly 202 may be mounted above the container conveyance assembly 204 and move vertically upward out of the way of the container 102.

The support platform 206 can be made of or include material strong enough to support one or more containers 102 positioned on the container transport 104. The support platform 206 can include mounting surfaces for mounting one or more components. For example, the support platform 206 can be a platform with a top mounting surface and a bottom mounting surface for mounting of various components. In some embodiments, the mounting surfaces may include mounting points and/or mounting hardware for the mounting of the various components.

In many embodiments, the support platform 206 includes an attachment point 208 for attaching of the container transport 104 to the robotic manipulator 110. The attachment point 208 can connect with one end of the robotic manipulator 110, such that, the robotic manipulator is able to move the container transport 104. The connection between the robotic manipulator 110 and the attachment point 208 can be strong enough to support the combined weight of the container transport 104 and one or more containers 102. The attachment point 208 can include connection points for coupling power, signal lines, hydraulic lines, pneumatic lines, and/or other suitable connections for elements that may facilitate proper functioning of components incorporated in the container transport 104. The connection points can be used, for example, to connect the container transport 104 to a common power source shared by the robotic manipulator 110. The attachment point 208 can be manually connected to the robotic manipulator 110 or can automatically connect with the robotic manipulator. For example, the attachment point 208 can be or include a quick connect attachment for automatic connection with the robotic manipulator 110.

The container conveyance assembly 204 can define a portion of a container passage 114 for movement of the containers 102. For example, the container conveyance assembly 204 can define the bottom portion of the container passage 114. The containers 102 can be moved along or through the container passage 114 by the container conveyance assembly 204 and/or the container manipulation assembly 202. The container manipulation assembly 202 can move relative to the container passage 114, such by movement between the inside and the outside of the container passage 114, being removed from the inside and/or the outside of the container passage, or being relocated between the inside and/or the outside of the container passage. For example, a suction cup, hook, and/or other portion of the container manipulation assembly 202 can move outside of the container passage 114 and engage with the container 102. In various embodiments, when the container manipulation assembly is moved inside the container passage 114, a suction cup, hook and/or other portion of the container manipulation assembly 202 can be positioned above the container conveyance assembly 204. Further, when the container manipulation assembly is outside the container passage 114, the container manipulation assembly 202 can be positioned beneath the container conveyance assembly 204. The container manipulation assembly 202 can engage with and/or move the containers 102 when the container manipulation assembly is positioned inside or outside the container passage 114.

As an illustrative example, the container manipulation assembly 202 can be positioned at least partially below the container conveyance assembly 204 (e.g., outside of the container passage 114) and move vertically upward to a position where at least a portion of the container manipulation assembly 202 is above the container conveyance assembly 204 (e.g., inside the container passage 114). The container manipulation assembly 202 can move laterally to a position to engage with the container 102 (e.g., a position where at least a portion of the container manipulation assembly 202 is outside of the container passage 114). The container manipulation assembly 202 can engage with the container 102 and pull the container 102 at least partially onto the container conveyance assembly 204 (e.g., by moving laterally until the container manipulation assembly 202 is positioned inside the container passage 114). The container manipulation assembly 202 can move vertically downward to a position below the container conveyance assembly 204 (e.g., outside of the container passage 114) to allow the container conveyance assembly 204 to convey the container 102. The container 102 can be conveyed through the container passage 114, e.g., from one end of the container transport 104 to another end of the container transport. While the container manipulation assembly 202 is positioned below the container conveyance assembly 204 (e.g., outside of the container passage 114) the container manipulation assembly can move laterally from one side of the container conveyance assembly to the other side. At least a portion of the container manipulation assembly 202 can move vertically upward to a position above the container conveyance assembly 204 (e.g., inside the container passage 114) and engage with and move laterally to push the container off of the container conveyance assembly (e.g., to a position where the container conveyance assembly is at least partially outside of the container passage).

FIG. 2B is a detailed illustration of an example container conveyance assembly 204 that can be included in particular embodiments of the container transport 104 of FIG. 2A. The container conveyance assembly 204 can include one or more rollers 212 driving one or more conveyance surfaces 214. The rollers 212 can have a length that occupies at least a part of the width distance 218. The width distance 218 can correspond to the combined width of the one or more conveyance surfaces 214 and the opening 210. The width distance 218 can correspond to the width of the containers 102 or may be a larger or smaller width than the width of the containers. The rollers 212 can be mounted to the support platform 206 and rotate in one or more directions. Some or all of the rollers 212 can be driven by one or more motors. The rollers 212 can be spaced apart from one another by a length distance 216. The length distance 216 can be equal to or greater than the length of containers 102. For example, a container 102 can be positioned on the conveyance surfaces 214 between the two rollers 212.

The one or more conveyance surfaces 214 can be positioned on the rollers 212 and have an upper surface for receiving and conveying the containers 102. The conveyance surfaces 214 can be positioned a length distance 216 apart, forming an opening 210. For example, the conveyance surfaces 214 can be positioned a distance apart to form opening 210 that allows at least a portion of the container manipulation assembly 202 to move between the conveyance surfaces 214. Additionally or alternatively, the opening 210 can allow the container manipulation assembly to be positioned below the upper surface of the conveyance surfaces 214. The conveyance surfaces 214 can be or include a belt, a chain, a roller chain, a plastic chain, a loop of material, for example, rubber or nylon, or any suitable device for supporting and transporting the containers 102.

In some embodiments, the container conveyance assembly 204 can include beltless, motor-driven rollers for conveying the containers 102. The beltless, motor-driven rollers can be driven by one or more motors for moving the containers 102 through the container passage 114.

In many embodiments, the container conveyance assembly 204 can include one or more side rails 220 positioned on the sides of the conveyance surfaces 214. The side rails 220 can be sized and shaped to guide the centerline of the containers 102 toward the centerline of the container conveyance assembly 204. For example, the side rails 220 can be positioned further apart at a receiving section of the container conveyance assembly 204 and narrow toward the center of the container conveyance assembly. The side rails 220 can be or include metal or similar material that can withstand the force of a container 102 that is in motion. In some embodiments, the side rails 220 can be used to hold the containers 102 at a center of the container conveyance assembly 204. The side rails 220 may be or include resilient material that can flex to accommodate different sizes of containers 102. In further embodiments, the side rails 220 can be adjustable to accommodate different sizes of containers 102 and/or hold the containers in place on the container conveyance assembly 204.

Figure 2C:
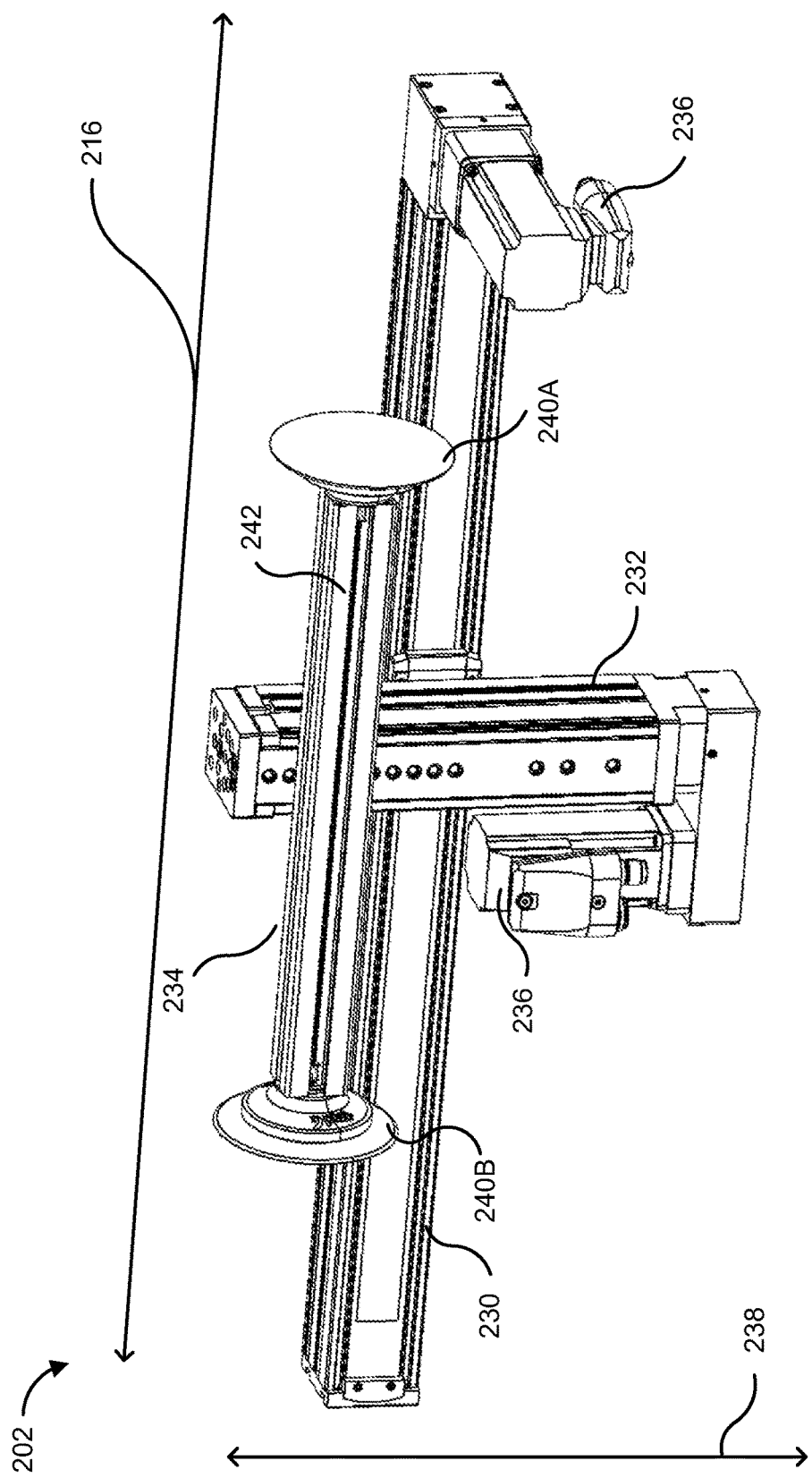
FIG. 2C illustrates an example container manipulation assembly that can be included in particular embodiments of the container transport of FIG. 2A.

Turning now to FIG. 2C, a detailed illustration of an example container manipulation assembly 202 is shown that can be included in particular embodiments of the container transport 104 of FIG. 2A. The container manipulation assembly 202 can include a lateral actuator 230, a vertical actuator 232, and an engagement assembly 234.

The lateral actuator 230 can move the engagement assembly 234 along length distance 216, which may correspond to a centerline from a first roller 212A to a second roller 212B. The lateral actuator 230 can be powered by one or more motors 236. The lateral actuator 230 can be attached to the support platform 206 and the engagement assembly 234 and can be positioned to align the engagement assembly 234 to pass through opening 210.

The vertical actuator 232 can move the engagement assembly 234 along direction 238, which may correspond to a vertical direction that is normal to or approximately normal to a horizontal direction. The vertical actuator 232 can be connected to the lateral actuator 230 and can move the engagement assembly 234 at the same time the lateral actuator 230 moves the engagement assembly to position the engagement assembly for engaging with containers 102. However, each of the lateral actuator 230 and the vertical actuator 232 may move one at a time to position the engagement assembly 234. The vertical actuator 232 can be driven by one or more motors 236. Direction 238 can be normal to or substantially normal to length distance 216.

The engagement assembly 234 can include one or more engagement surfaces 240 for engaging with the containers 102. The engagement surfaces 240 can be mounted to the container manipulation assembly 202 for movement into and out of the container passage 114. For example, the portion of the container manipulation assembly 202 that moves into and out of the container passage 114 can be or include the engagement surfaces 240. The engagement surfaces 240 can be mounted to a central support 242. The central support 242 can connect the engagement surfaces 240 to the vertical actuator 232. The engagement surfaces 240 can be or include suction cups, suction devices, hooks, adhesive surfaces, magnetic surfaces, and/or any suitable component for engaging with the containers. For example, the engagement surfaces 240 can be vacuum suction cups for suctioning to a surface of the containers 102. In some embodiments, the vacuum suction cups can be turned on and off. Additionally or alternatively, the suction cups may be powered by or have a least a portion of the vacuum provided by the robotic manipulator 110. The engagement assembly 234 can include a moveable joint connecting the engagement surfaces 240 with the central support 242. The moveable joint can allow the engagement surfaces 240 to pivot relative to the central support when engaging with the containers 102.

In many embodiments, a first engagement surface 240A can engage with the containers 102 to pull the containers onto the container conveyance assembly 204. A second engagement surface 240B can engage with the containers to push the containers off of the container conveyance assembly 204. However, the first and/or second engagement surface 240A, 240B can be used to pull the containers 102 onto the container conveyance assembly 204 and push the containers off of the container conveyance assembly. For example, the engagement assembly 234 may include an engagement surface 240 and the central support 242 can pivot relative to the vertical actuator 232 to spin the engagement surface for pushing or pulling of the containers 102. The engagement surface 240 may be facing a first direction for engaging with the containers 102 to pull the containers onto the container conveyance assembly 204 and swing to a second direction to push the containers off of the container conveyance assembly. The first and second directions may be generally opposing directions.

Figure 3:
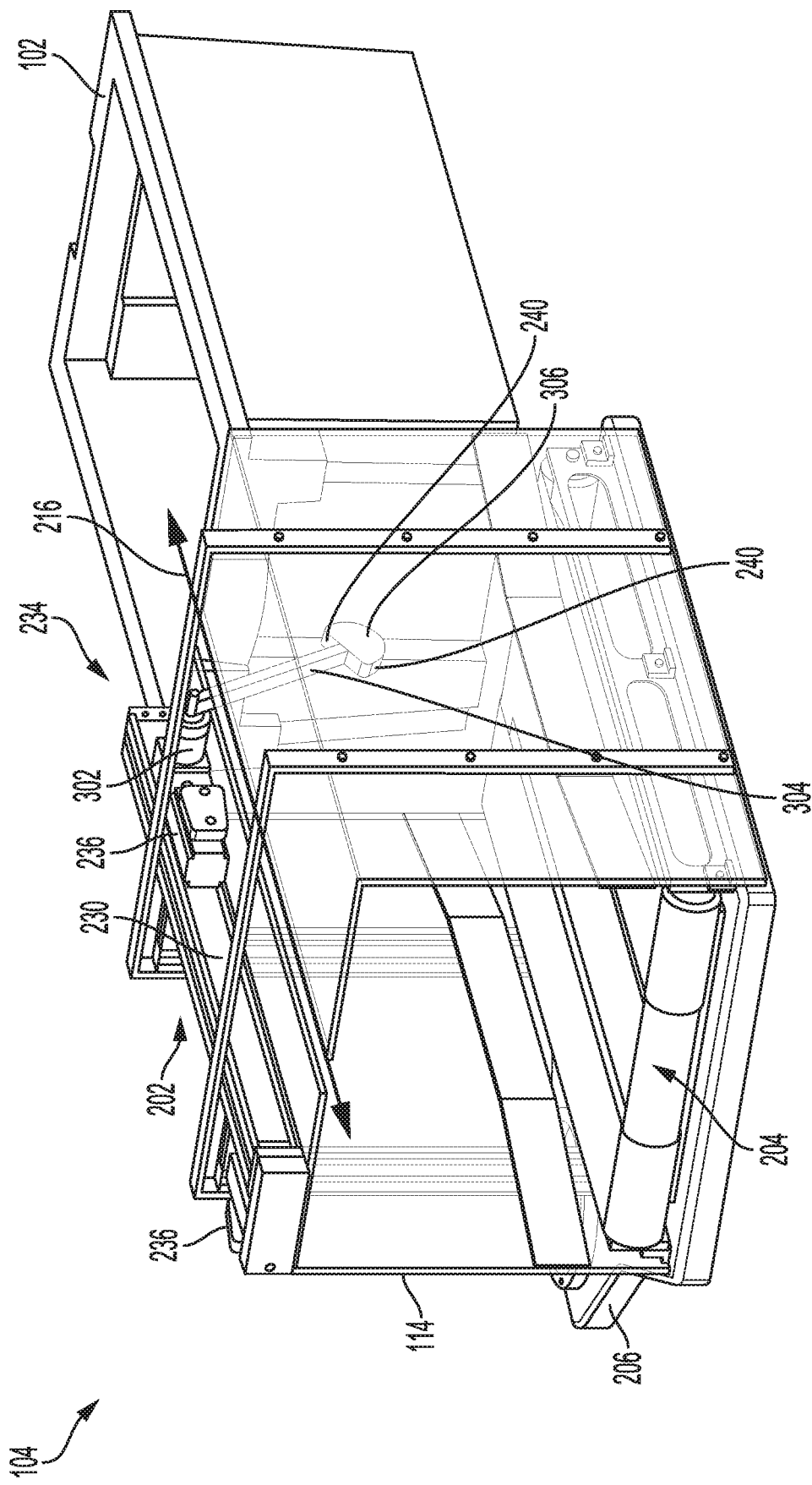
FIG. 3 illustrates an additional example container transport that can be included in particular embodiments of the container management system of FIG. 1.

Turning now to FIG. 3, an additional example of a container transport 104 that can be included in particular embodiments of the container management system 100 of FIG. 1 is shown. The container transport 104 can include any and/or all of the components described in reference to FIGS. 2A, 2B, and 2C, however, the container transport 104 may include additional and/or alternative components. In various embodiments, the container transport 104 can include a container manipulation assembly 202 and a container conveyance assembly 204 mounted to support platform 206. The container manipulation assembly 202 can be mounted to the support platform 206 at a position above the container conveyance assembly 204. The container manipulation assembly can include a lateral actuator 230, one or more motors 236, and an engagement assembly 234. The lateral actuator 230 can move the engagement assembly 234 along length distance 216. For example, the lateral actuator 230 can move the engagement assembly 234 at least a portion of a distance from the first side of the container transport 104 to the second side of the container transport. The lateral actuator 230 and/or the engagement assembly 234 can be driven by one or more motors 236.

The engagement assembly 234 can include rotational actuator 302, arm 304, and engagement end 306. The rotational actuator 302 can rotate the arm 304 and the engagement end 306 between various positions. For example, the rotational actuator 302 can rotate the arm 304 and the engagement end 306 between a first position for engaging with containers 102 and a second position for movement of the container by the container conveyance assembly 204. In some embodiments, the rotational actuator 302 can rotate between 0 degrees and 180 degrees relative to horizontal and/or can rotate 360 degrees, although any other suitable range of motion may be utilized. The rotational actuator 302 can be or include a motor, a stepper motor, a rotational motor, and/or any suitable device for rotating the arm 304 and/or the engagement end 306.

The arm 304 can connect the engagement end 306 with the rotational actuator 302. The arm 304 can have a length to engage the engagement end 306 with the container 102. In various embodiments, the arm 304 can have a variable length. For example, the arm 304 can have a first length to get out of the path of the container 102 when the container is being moved by the container conveyance assembly 204 and a second length when engaging with the container 102. In various embodiments, the arm 304 can be the same or similar to central support 242. In further embodiments, the arm 304 can be or include metal, plastic, carbon fiber, or a other material with enough strength to move the container 102.

The engagement end 306 can engage with the container 102. For example, the engagement end 306 can be or include a hook shape and/or a curved surface for engaging with the container 102. For example, the engagement end 306 can engage with one or more protrusions on the container 102 (e.g., which may correspond to a handle or other grasping feature incorporated in the container). The engagement end 306 can be used to push and/or pull the container 102 onto the container transport 104. In various embodiments, the engagement end 306 can be or include one or more engagement surfaces 240. The engagement surfaces 240 can be shaped for engaging with the container 102. For example, the engagement surfaces 240 can have a hook shape and/or a curved shape to engage with the container 102. Additionally or alternatively, the engagement surfaces 240 can be or include a suction cup, a vacuum suction, a hook and loop connection, adhesives, and/or any material suitable for engaging with the container 102.

Figure 4A:
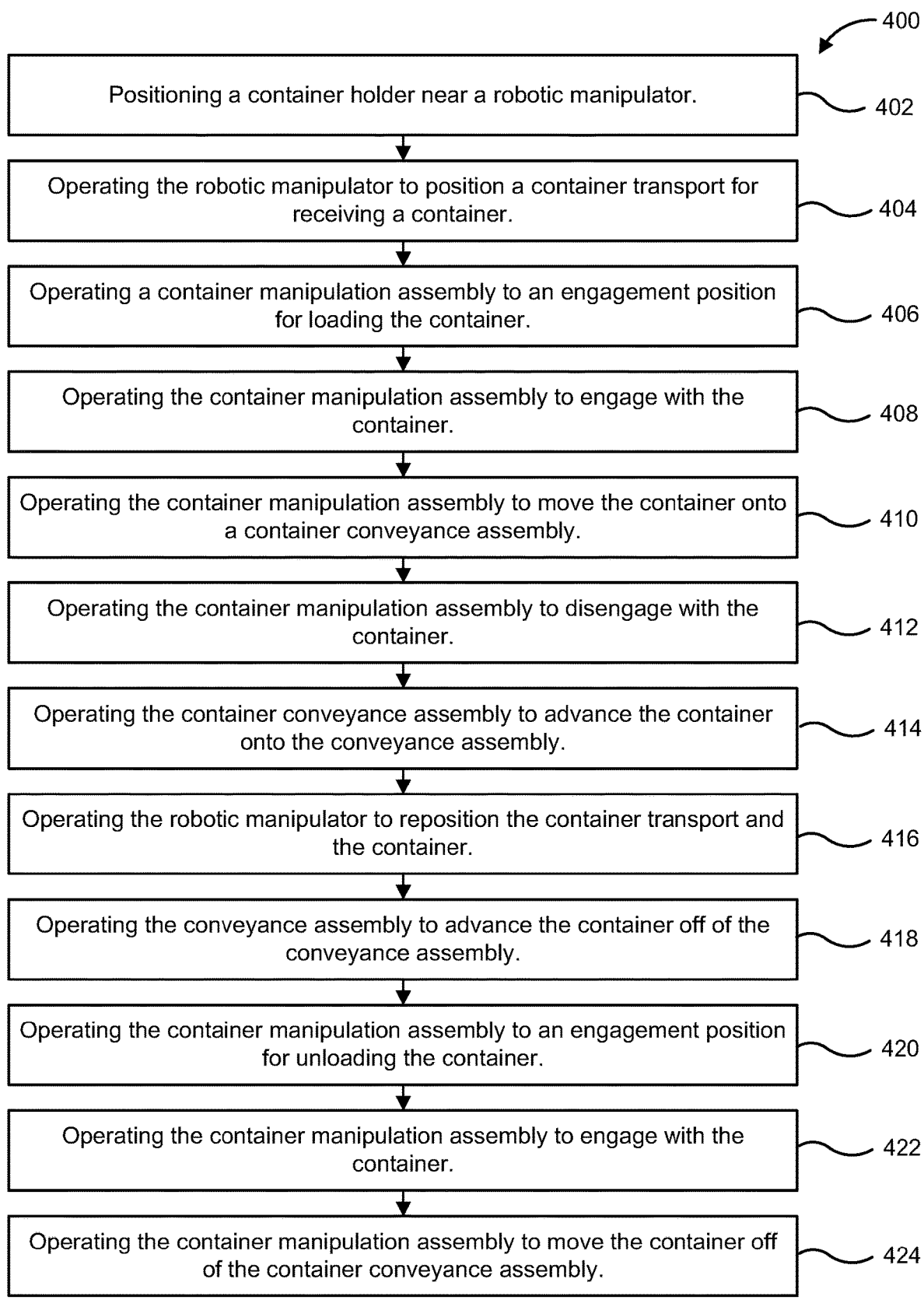
FIGS. 4A and 4B are a flowchart illustrating a process for moving containers using the container management system of FIG. 1.
Figure 4B:
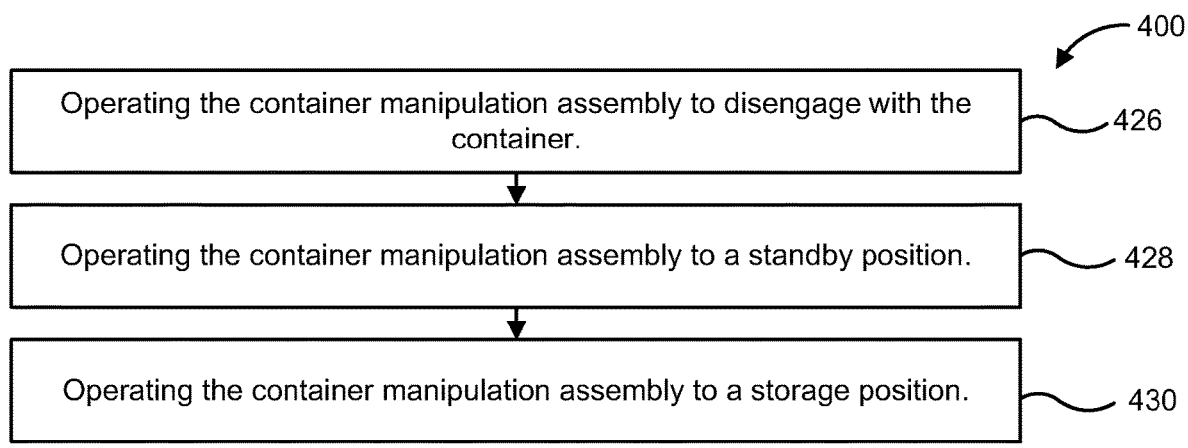

Turning now to FIGS. 4A and 4B, a flowchart illustrating a process 400 for moving containers 102 using the container management system 100 of FIG. 1 is shown. Various blocks of the process 400 are described by referencing the components shown in FIGS. 5 through 22, however, additional or alternative components may be used with the process. FIGS. 5 through 22 illustrate the example process 400 using particular embodiments of the example container transports 104 of FIGS. 2A and 3.

The process 400 at block 402 can include positioning a container holder (e.g., container holder 106) near a robotic manipulator (e.g., robotic manipulator 110). The container holder 106 can be positioned using a mobile drive unit (e.g., mobile drive unit 108). The container holder 106 can include one or more containers (e.g., containers 102). The containers 102 can be empty or may be filled with one or more items. The robotic manipulator 110 can be pre-attached or perform an attachment action to attach to a container transport (e.g., container transport 104) and move the container transport 104 next to the container holder 106.

Figure 5:
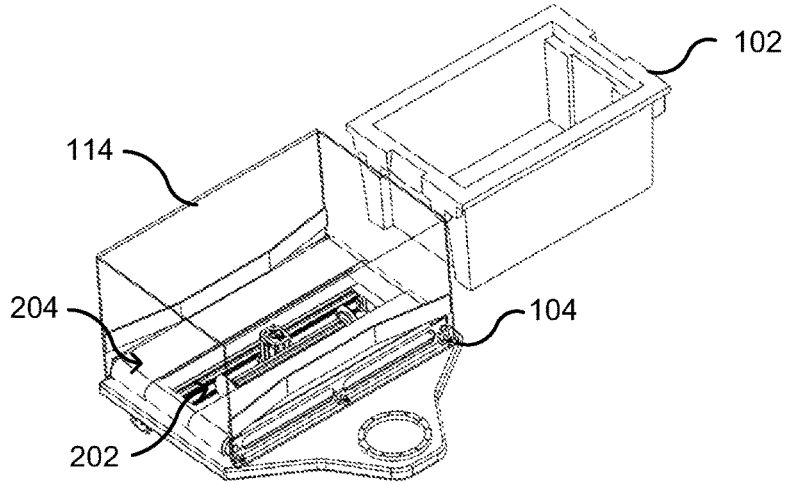
FIG. 5 illustrates various states of components that may be implemented in a simplified example process for receiving, moving, and depositing a container that can be used with particular embodiments of the example container transport of FIG. 2A.

The process 400 at block 404 can include operating the robotic manipulator 110 to position the container transport 104 for receiving a container 102. FIG. 5 is an illustration of the container transport 104 positioned next to a container 102. The container 102 can be positioned in the container holder 106 or may be positioned on another surface and/or held. The container transport 104 can be positioned next to the container 102 to substantially align the container with container passage 114. The container transport 104 can be positioned next to and aligned with the container 102 by the robotic manipulator 110, the mobile drive unit 108, and/or any device suitable for moving the container transport.

Figure 6:
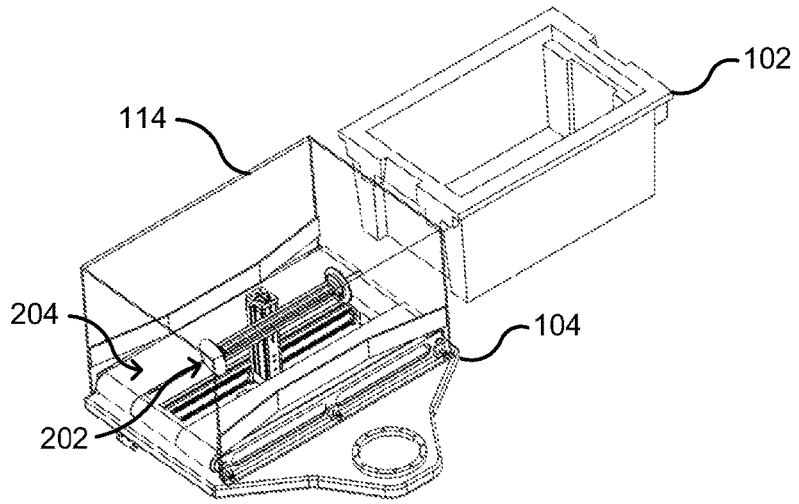
FIG. 6 illustrates various states of components that may be implemented in a simplified example process for receiving, moving, and depositing a container that can be used with particular embodiments of the example container transport of FIG. 2A.

The process 400 at 406 can include operating a container manipulation assembly 202 to an engagement position for engagement with the container 102. The container manipulation assembly 202 can be operated to a position where at least a portion of the container manipulation assembly is inside the container passage 114. For example, FIG. 6 shows the container manipulation assembly 202 after the container manipulation assembly has been operated to move vertically upward from a position beneath the container manipulation assembly 202 to a position where at least a portion of the container manipulation assembly is inside the container passage 114. At least a portion of the container manipulation assembly 202 may additionally or alternatively enter the container passage 114 from above the container 102 and/or the side of the container. For example, at least a portion of the container manipulation assembly 202 can rotate downward and toward the container 102 and enter the container passage 114. Additionally or alternatively, the container manipulation assembly 202 can have a portion positioned inside the container passage 114 and rotate towards the container 102 to engage the container.

Figure 7:
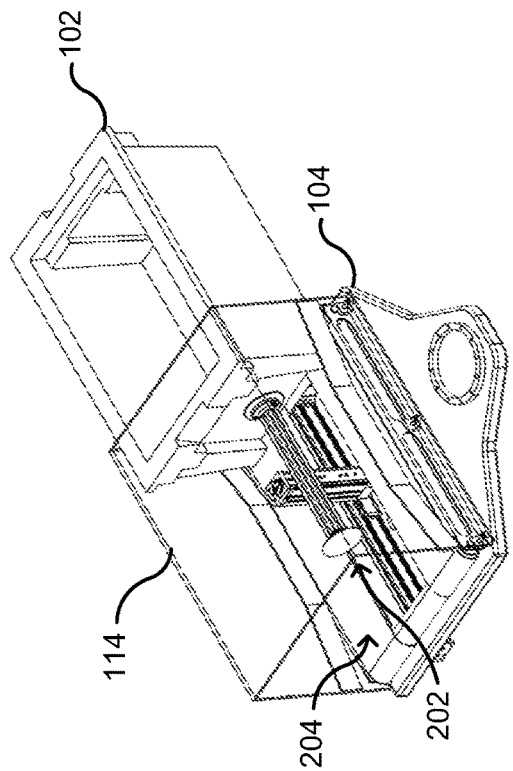
FIG. 7 illustrates various states of components that may be implemented in a simplified example process for receiving, moving, and depositing a container that can be used with particular embodiments of the example container transport of FIG. 2A.
Figure 17:
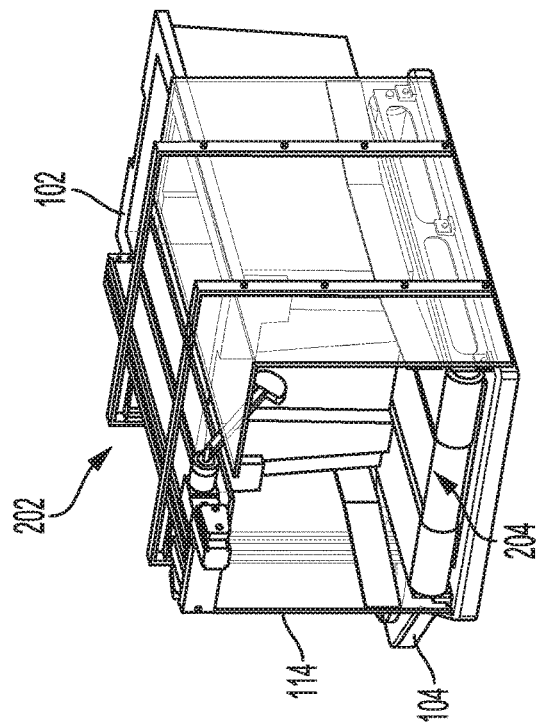
FIG. 17 illustrates various states of components that may be implemented in a simplified example process for receiving, moving, and depositing a container that can be used with particular embodiments of the example container transport of FIG. 2A.

The process 400 at 408 can include operating a container manipulation assembly 202 to engage with the container 102. FIGS. 7 and 17 illustrate the container manipulation assembly 202 after engaging with the container 102. At least a portion of the container manipulation assembly 202 can be positioned outside of the container passage 114 to engage with the container 102. The container manipulation assembly 202 can move laterally to engage with the container 102 (e.g., as shown in FIG. 7) and/or a portion of the container manipulation assembly can rotate to engage with the container (e.g., as shown in FIG. 17). The container manipulation assembly 202 can engage with the container 102 using a suction cup, a vacuum, a hook, a curved surface, and/or other engagement component suitable for engaging with the container 102.

Figure 8:
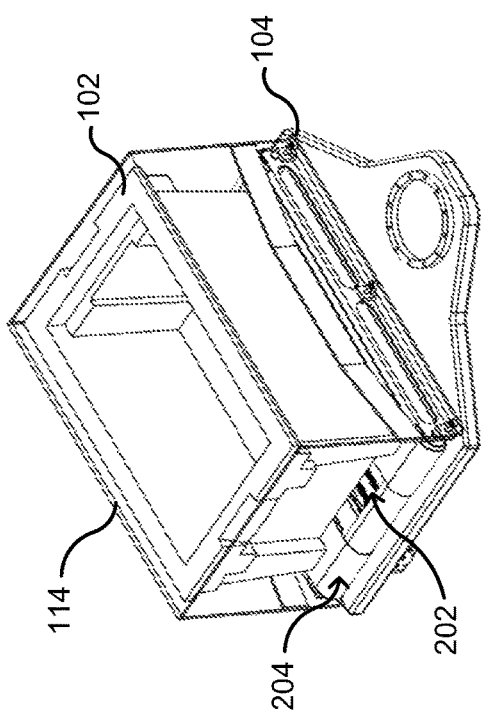
FIG. 8 illustrates various states of components that may be implemented in a simplified example process for receiving, moving, and depositing a container that can be used with particular embodiments of the example container transport of FIG. 2A.
Figure 18:
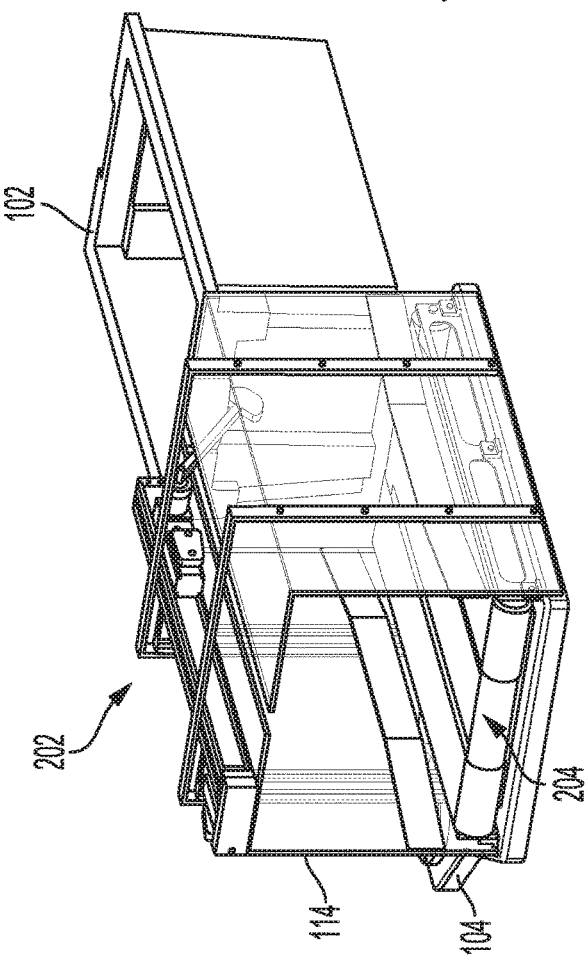
FIG. 18 illustrates various states of components that may be implemented in a simplified example process for receiving, moving, and depositing a container that can be used with particular embodiments of the example container transport of FIG. 2A.

The process 400 at 410 can include operating the container manipulation assembly to move the container 102 onto a container conveyance assembly 204. While engaged with the container 102, the container manipulation assembly 202 can pull the container until at least a portion of the container is positioned on the container conveyance assembly 204 and/or inside the container passage 114. FIGS. 8 and 18 illustrate the container 102 after a portion of the container has been pulled onto the container conveyance assembly 204 by the container manipulation assembly 202. At least a portion of the container 102 and the container manipulation assembly 202 can be positioned inside the container passage 114. The container conveyance assembly 204 may aid the container manipulation assembly 202 in the movement of the container 102 onto the container conveyance assembly. The container manipulation assembly 202 can pull the container 102 in a lateral direction (e.g., as shown in FIGS. 8 and 18). However, the container manipulation assembly 202 can additionally or alternatively pull the container 102 onto the container conveyance assembly 204 by rotating and/or moving in multiple directions. For example, the container manipulation assembly 202 can rotate in conjunction with the arm 304 changing length to pull the container 102 onto the container conveyance assembly 204.

Figure 9:
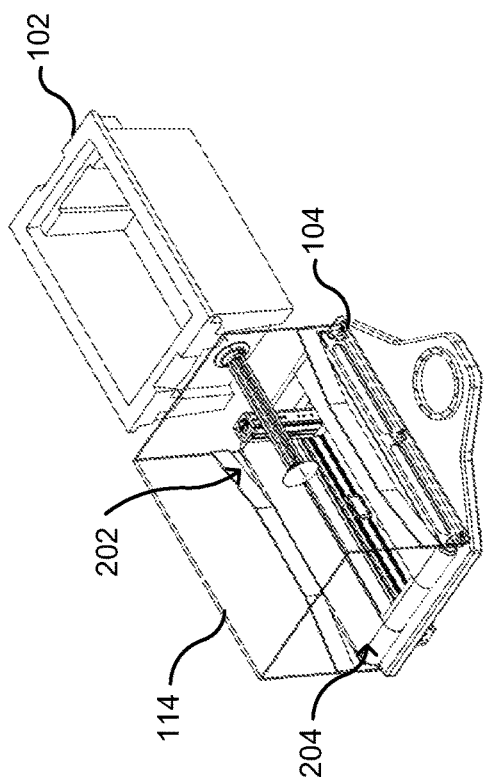
FIG. 9 illustrates various states of components that may be implemented in a simplified example process for receiving, moving, and depositing a container that can be used with particular embodiments of the example container transport of FIG. 2A.

The process 400 at 412 can include operating the container manipulation assembly 202 to disengage with the container 102. The container manipulation assembly 202 may disengage with the assembly by turning off the vacuum, rotating away from the container, and/or via a disengagement component. FIG. 9 illustrates the container manipulation assembly 202 after the container manipulation assembly has disengaged with the container 102. The container manipulation assembly 202 can move vertically downward and outside of the container passage 114. The container manipulation assembly 202 can move to a position below the container conveyance assembly 204 to allow the container 102 to pass above the container manipulation assembly. However, the container manipulation assembly 202 may move outside of the container passage 114 above and/or to the side of the container 102. For example, the container manipulation assembly 202 can rotate upwards and away from the container 102 until at least a portion of the container manipulation assembly is outside of the container passage 114.

Figure 10:
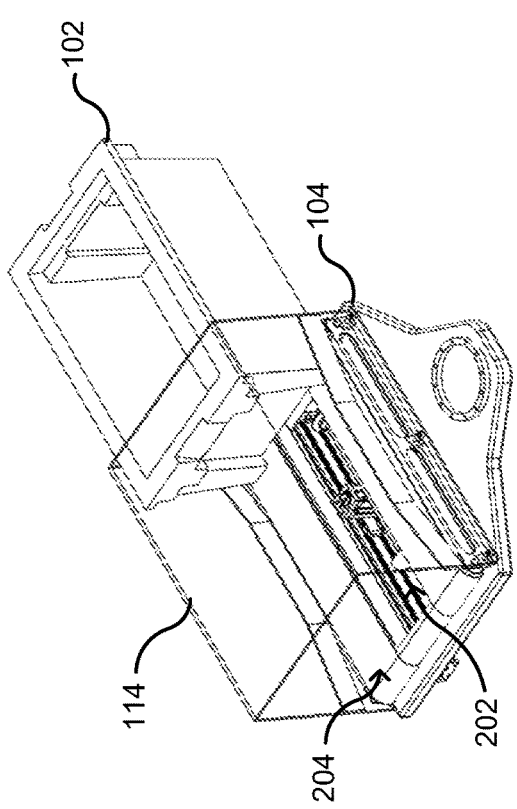
FIG. 10 illustrates various states of components that may be implemented in a simplified example process for receiving, moving, and depositing a container that can be used with particular embodiments of the example container transport of FIG. 2A.
Figure 19:
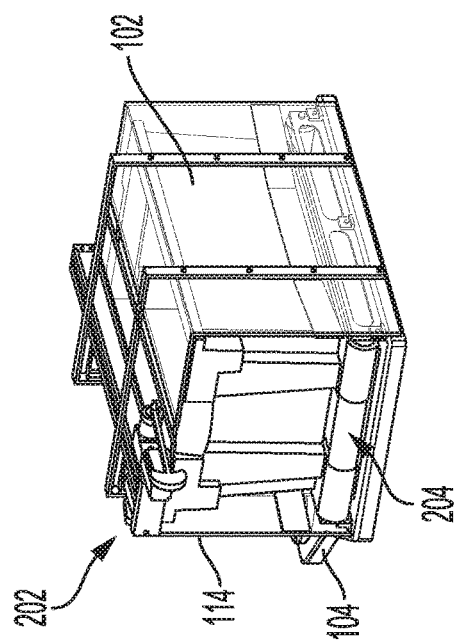
FIG. 19 illustrates various states of components that may be implemented in a simplified example process for receiving, moving, and depositing a container that can be used with particular embodiments of the example container transport of FIG. 2A.

The process 400 at 414 can include operating the container conveyance assembly 204 to advance the container 102 onto the container conveyance assembly. The container 102 can be conveyed until some, all, or substantially all of the container is positioned in the container passage 114 and/or on the container conveyance assembly 204. FIGS. 10 and 19 illustrate the container 102 positioned inside the container passage 114. The container 102 can be conveyed past the container manipulation assembly 202 positioned outside of the container passage 114 without the container manipulation assembly interfering with the container.

The process 400 at 416 can include operating the robotic manipulator 110 to reposition the container transport 104 and the container 102. The robotic manipulator 110 can move the container transport 104 and the container 102 to a position for unloading of the container. The container 102 can be positioned inside or substantially inside the container passage 114 when the robotic manipulator 110 is repositioning the container transport 104 and the container. For example, the container 102 can be positioned on the container transport 104 at or near the position of the container shown in FIG. 10 or in FIG. 19.

Figure 11:
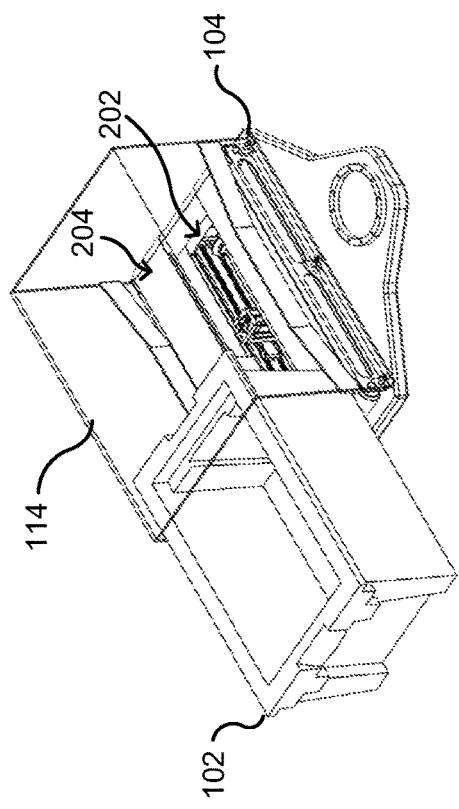
FIG. 11 illustrates various states of components that may be implemented in a simplified example process for receiving, moving, and depositing a container that can be used with particular embodiments of the example container transport of FIG. 2A.

The process 400 at 418 can include operating the container conveyance assembly 204 to advance the container 102 off of the container conveyance assembly. The container 102 can be conveyed until a portion of the container is off of the container conveyance assembly 204 and/or outside of the container passage 114. FIG. 11 illustrates the container 102 positioned partially off of the container conveyance assembly 204 and partially outside of the container passage 114. While the container 102 is being conveyed by the container conveyance assembly 204, the container manipulation assembly 202 can move outside of the container passage 114. The container manipulation assembly 202 may move to a position for engagement with the container 102. For example, the container manipulation assembly 202 may move laterally outside of the container passage 114 from a first side of the container transport 104 to a second side of the container transport 104. The container manipulation assembly 202 can move laterally from one side of the container transport 104 to the other underneath the container 102 and/or the container conveyance assembly 204. However, the container manipulation assembly 202 can move above and/or to the side of the container and/or the container conveyance assembly 204. For example, the container manipulation assembly 202 can move above the container 102 from one side of the container to the other side.

Figure 12:
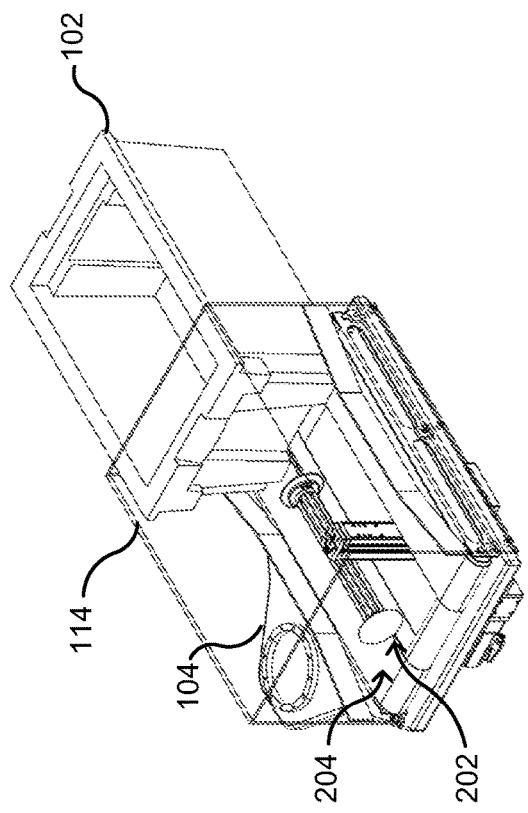
FIG. 12 illustrates various states of components that may be implemented in a simplified example process for receiving, moving, and depositing a container that can be used with particular embodiments of the example container transport of FIG. 2A.

The process 400 at 420 can include operating the container manipulation assembly 202 to an engagement position for unloading the container 102. FIG. 12, in which the view of the container transport 104 has been rotated relative to the view shown in FIGS. 5 through 11, illustrates the container manipulation assembly 202 in a state of having moved into position inside the container passage 114. The container manipulation assembly 202 can move vertically upwards (e.g., along direction 238 from earlier FIG. 2C). Additionally or alternatively, a portion of the container manipulation assembly 202 can rotate to a position for engaging with the container 102 (such as in FIG. 20). At least a portion of the container manipulation assembly 202 can be positioned inside the container passage 114 and aligned with the container 102. The container manipulation assembly 202 may be aligned with an engagement surface on the container 102. The container manipulation assembly 202 may be in the same or a similar position as shown in FIG. 5. In some embodiments, a portion of the container manipulation assembly 202 may rotate relative to the container transport 104. For example, the container manipulation assembly 202 may rotate to align the engagement surface used to pull the container 102 onto the container conveyance assembly 204 with the container for pushing the container off of the container conveyance assembly.

Figure 13:
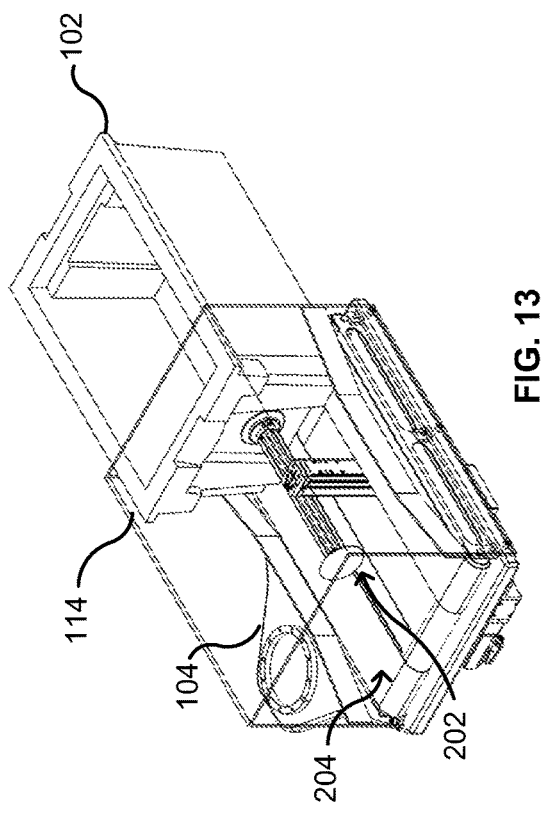
FIG. 13 illustrates various states of components that may be implemented in a simplified example process for receiving, moving, and depositing a container that can be used with particular embodiments of the example container transport of FIG. 2A.
Figure 20:
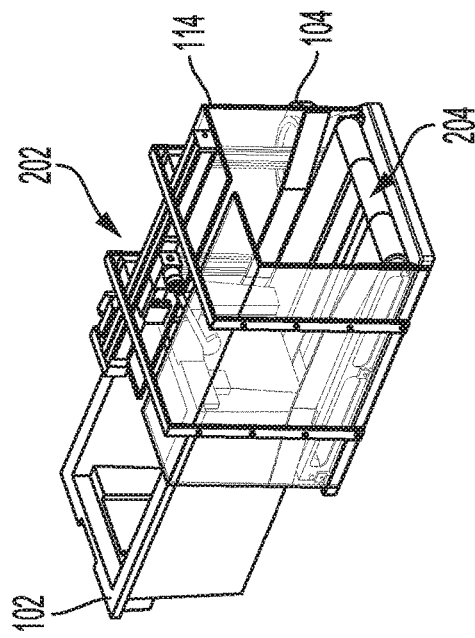
FIG. 20 illustrates various states of components that may be implemented in a simplified example process for receiving, moving, and depositing a container that can be used with particular embodiments of the example container transport of FIG. 2A.

The process 400 at 422 can include operating the container manipulation assembly 202 to engage with the container 102. FIGS. 13 and 20 illustrate the container manipulation assembly 202 in a state of having moved to engage with the container 102. Similarly to FIG. 12, the view of the container transport 104 in FIG. 20 has been rotated relative to the view shown in FIGS. 17 through 19. The container manipulation assembly 202 can move in a lateral direction (e.g., length distance 216 from FIG. 2A). Additionally or alternatively, the container manipulation assembly 202 can rotate to engage with the container 102. The container manipulation assembly 202 can engage with the container 102 and begin to push the container off of the container conveyance assembly 204. In some embodiments, the container manipulation assembly 202 may be aided by the container conveyance assembly 204 to push the container 102.

Figure 14:
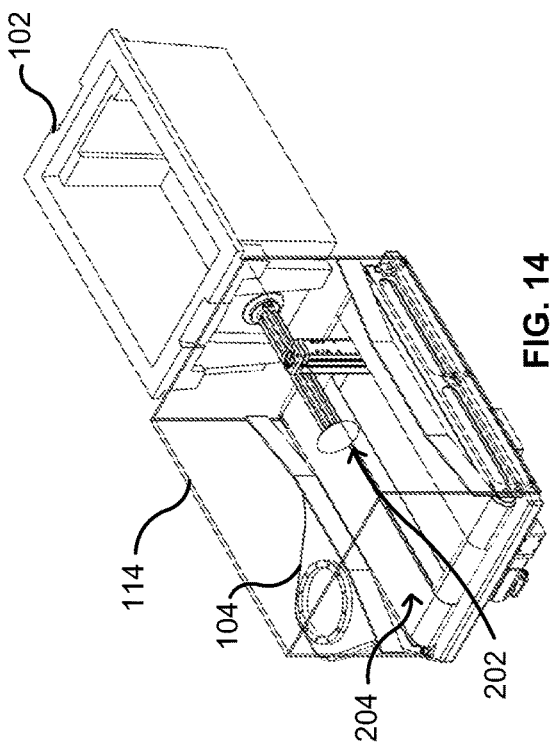
FIG. 14 illustrates various states of components that may be implemented in a simplified example process for receiving, moving, and depositing a container that can be used with particular embodiments of the example container transport of FIG. 2A.
Figure 21:
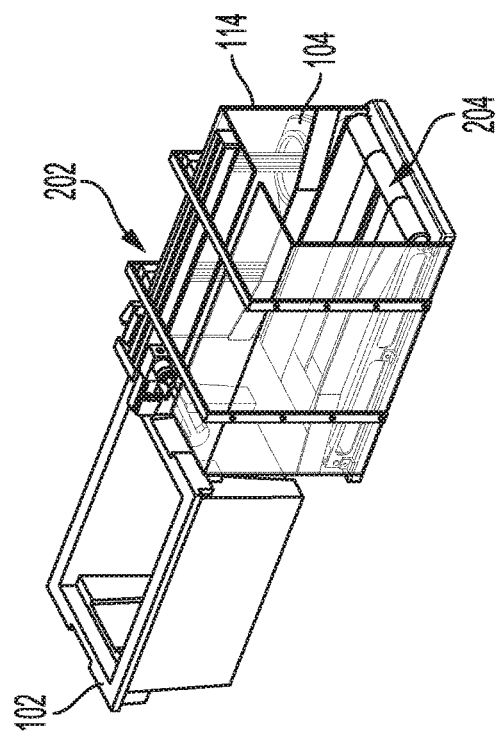
FIG. 21 illustrates various states of components that may be implemented in a simplified example process for receiving, moving, and depositing a container that can be used with particular embodiments of the example container transport of FIG. 2A.

The process 400 at 424 can include operating the container manipulation assembly 202 to move the container 102 off of the container conveyance assembly 204. FIGS. 14 and 21 illustrates the container manipulation assembly 202 after the container 102 has been pushed off of the container conveyance assembly 204. The container manipulation assembly 202 can push the container 102 until the container and/or a portion of the container manipulation assembly is outside of the container passage 114. The container 102 may be pushed onto an output station 112 or other surface within a warehouse environment. The container 102 can be moved off of the container conveyance assembly 204 on a side opposite the side where the container was moved onto the conveyance assembly. For example, the container 102 can be moved onto a front side of the container conveyance assembly 204 and be moved off of a rear side of the conveyance assembly. However, the container 102 may be moved off of the container conveyance assembly 204 on the same side where the container was moved onto the conveyance assembly. For example, the container 102 may be moved onto the front side of the container conveyance assembly 204 and be moved off of the front side of the conveyance assembly. As an illustrative example, moving the container 102 on and off the same side of the container conveyance assembly 204 may facilitate moving the container 102 from an initial berth on a container holder 106 and into a subsequent berth at a different height, lateral position, and/or other variation in location.

The process 400 at block 426 can include operating the container manipulation assembly 202 to disengage with the container 102. The container manipulation assembly 202 can disengage with the container 102 and remain in the same or a similar position for engage with another container 102 (e.g., at least a portion of the container manipulation assembly 202 remains outside of the container passage 114).

In some embodiments, the container manipulation assembly 202 can disengage with the container 102 and return to a position where at least a portion of the container manipulation assembly is inside the container passage 114. The container manipulation assembly 202 can be positioned for alignment with another container 102 (e.g., a standby position).

Figure 15:
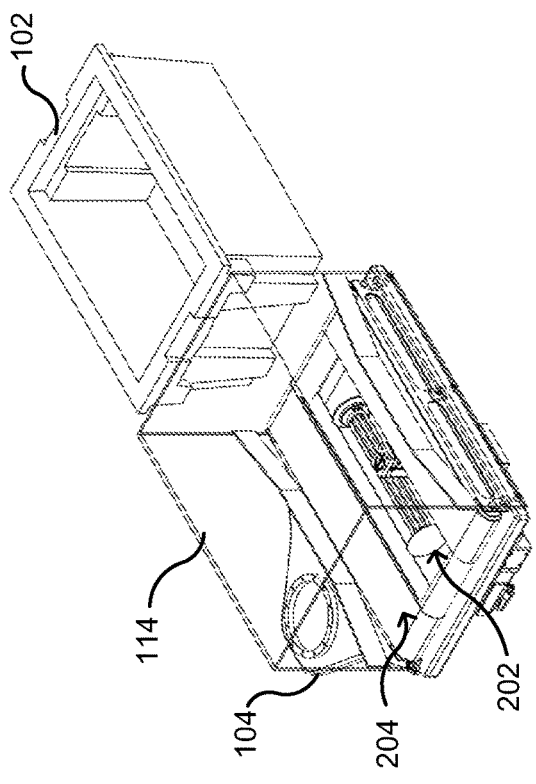
FIG. 15 illustrates various states of components that may be implemented in a simplified example process for receiving, moving, and depositing a container that can be used with particular embodiments of the example container transport of FIG. 2A.
Figure 22:
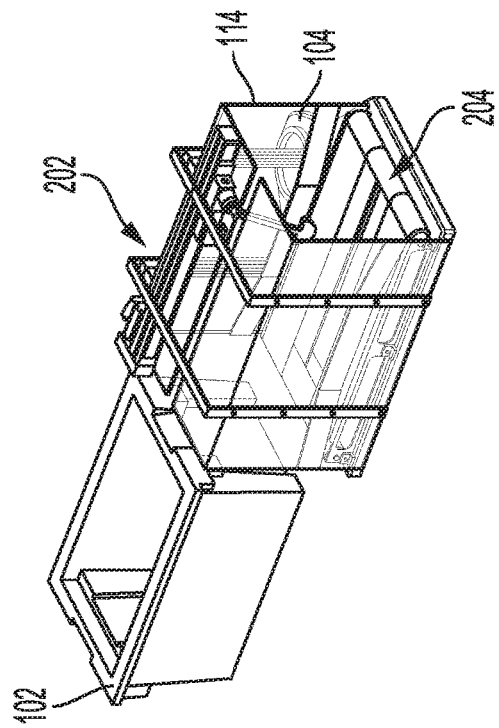
FIG. 22 illustrates various states of components that may be implemented in a simplified example process for receiving, moving, and depositing a container that can be used with particular embodiments of the example container transport of FIG. 2A.

The process 400 at block 428 can include operating the container manipulation assembly 202 to a standby position. FIGS. 15 and 22 illustrates the container manipulation assembly 202 in a state where at least a portion of the container manipulation assembly 202 is inside the container passage 114 (e.g., a standby position). The container manipulation assembly 202 can move laterally to the standby position. In the standby position, the container manipulation assembly 202 can receive further operating instructions.

In various embodiments, the container manipulation assembly 202 can move to a position for engaging with another container 102. For example, the container manipulation assembly 202 can move to a position at or near the position of the container manipulation assembly shown in FIG. 7.

Figure 16:
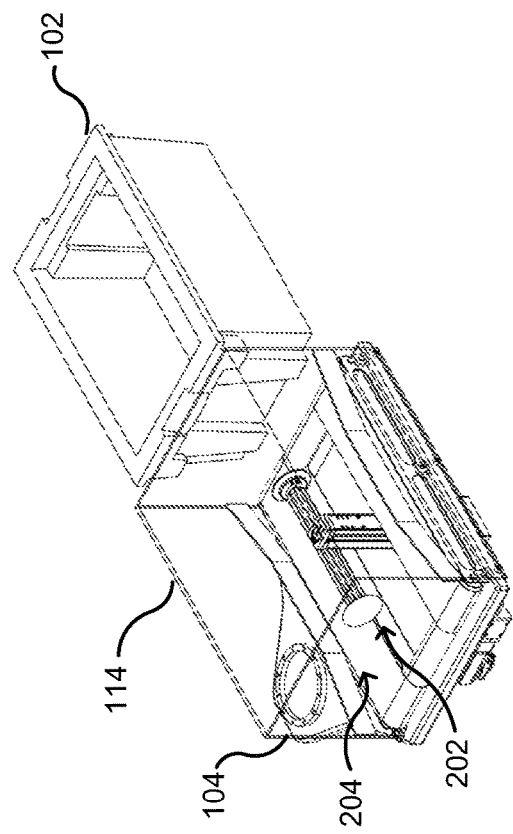
FIG. 16 illustrates various states of components that may be implemented in a simplified example process for receiving, moving, and depositing a container that can be used with particular embodiments of the example container transport of FIG. 2A.

In various embodiments, the container manipulation assembly 202 can move to a storage position from the standby position. The process 400 at 430 can include operating the container manipulation assembly 202 to the storage position. FIG. 16 illustrates the container manipulation assembly 202 in the storage position. In the storage position, the container manipulation assembly 202 can be positioned outside the container passage 114. With the container manipulation assembly 202 in the storage position, the robotic manipulator 110 may move the container transport 104.

Figure 23:
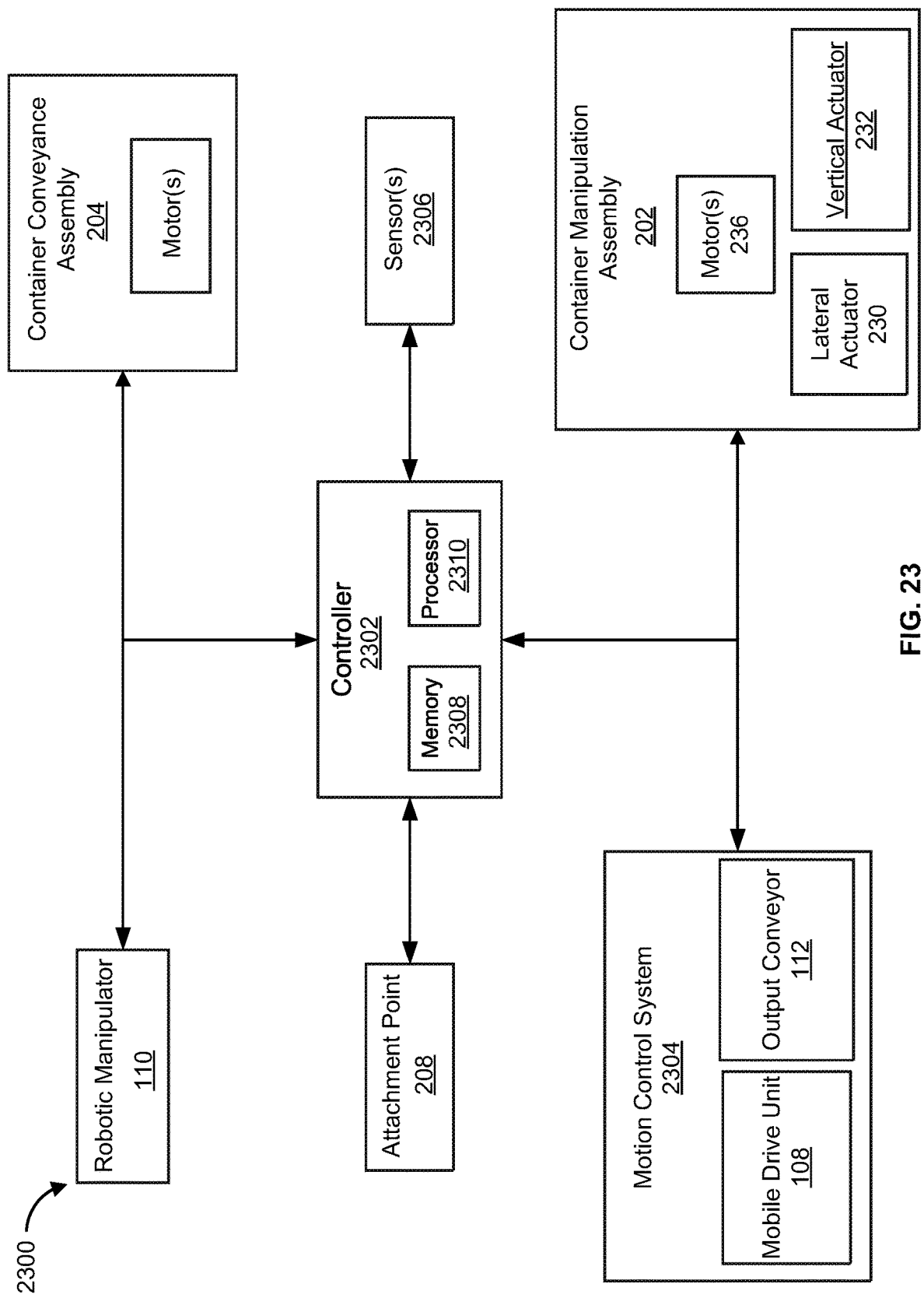
FIG. 23 is a simplified schematic diagram illustrating examples of control aspects that may be utilized in certain embodiments of the container management system of FIG. 1.

Turning to FIG. 23, a simplified schematic diagram 2300 illustrating examples of control aspects that may be utilized in certain embodiments of the container management system 100 of FIG. 1 is shown. A controller 2302 can communicate information and/or instructions associated with the container management system 100. The controller 2302 can be in communication with the robotic manipulator 110, the attachment point 208, a motion control system 2304, the container manipulation assembly 202, one or more sensors 2306, the container conveyance assembly 204, and/or respective components associated with such elements, such as graphically included within each element in FIG. 16. The controller 2302 can communicate via a wired or wireless connection (e.g., Bluetooth). The controller 2302 can include memory 2308 and a processor 2310. The memory 2308 and the processor 2310 can be included in a single structure. However, the memory 2308 and processor 2310 may be part of a system of multiple interconnected devices.

The memory 2308 can include any type of memory device that retains stored information when powered off. The memory 2308 can be or include electrically erasable and programmable read-only memory ("EEPROM"), flash memory, or any other type of non-volatile memory. In some examples, at least part of the memory 2308 can include a medium from which the processor 2310 can read instructions. A non-transitory computer-readable medium can include electronic, optical, magnetic, or other storage devices capable of providing the processor 2310 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 2310 can execute instructions stored in the memory 2308 to perform operations, for example, determining an item status based on item data. The processor 2310 can include one processing device or multiple processing devices. Non-limiting examples of the processor 2310 include a Field-Programmable Gate Array ("FPGA"), an application-specific integrated circuit ("ASIC"), a microprocessor, etc.

The motion control system 2304 can include components for communicating with the mobile drive unit 108, the output station 112, and/or any other components that may impart or control motion of containers 102 within the warehouse environment. The motion control system 2304 can include discreet components located at different locations. For example, a portion of the motion control system 2304 may be positioned on the mobile drive unit 108 and/or the output station 112.

The controller 2302 can be in communication with one or more sensors 2306 positioned on the container transport 104. The sensors 2306 can be positioned to measure data associated with the containers 102. For example, the sensors 2306 can detect a label positioned on a container 102. Additionally or alternatively, the sensors 2306 can detect a position of the containers 102 on the container transport 104. For example, the sensors 2306 can detect when a container 102 has moved out of the way of the container manipulation assembly 202. The sensors 2306 can include an optical sensor, a scanner, a weight sensor, a camera, or a component for obtaining data associated with the container 102.

In various embodiments, the sensors 2306 can additionally or alternatively measure data associated with any and/or all of the components of the container management system 100. For example, the sensors 2306 can measure data associated with the robotic manipulator, the container holder 106, the mobile drive unit 108, and/or the output station 112.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a support platform having an attachment point configured to engage with and be supported by a robotic manipulator;
    a conveyance assembly coupled with the support platform and comprising two conveyance surfaces separated by an opening and configured to receive a container on the conveyance surface for transporting the container between a front side and a rear side of a container passage, the container passage having a bottom side at least partially defined by the conveyance surfaces; and
    a container manipulation assembly coupled with the support platform and comprising:
        a container manipulator having first and second engagement surfaces configured to engage with the container;
        a vertical actuator configured to move the first and second engagement surfaces between a position below the container passage and a location inside the container passage along a first direction and through the opening; and
        a lateral actuator configured to move the first and second engagement surfaces along a second direction normal to the first direction to couple the first engagement surface with the container to move the container at least partially onto the conveyance surface, the lateral actuator further configured to move the first and second engagement surfaces along the second direction to couple the second engagement surface with the container to move the container off of the conveyance surfaces.

2. An item manipulation device, comprising:
    a support platform;
    two conveyance surfaces attached to the support platform and separated by an opening, the two conveyance surfaces configured to convey a container at least a portion of a distance from a first side of the support platform to an opposing second side of the support platform, wherein the conveyance surfaces define at least a portion of a container passage through which the container can be conveyed; and a manipulation assembly attached to the support platform and comprising first and second engagement surfaces, the manipulation assembly configured to (i) move the first and second engagement surfaces along a first direction through the opening between a position below the container passage and a location inside the container passage, (ii) move the first and second engagement surfaces along a second direction normal to the first direction to engage the first engagement surface with the container to move the container at least partially onto the conveyance surfaces, and (iii) move the first and second engagement surfaces along the second direction to engage the second engagement surface with the container to move the container off of the conveyance surfaces.

3. The item manipulation device of claim 2, wherein the first engagement surface is further configured to move outside the container passage to engage with and move the container at least partially onto the conveyance surfaces.

4. The item manipulation device of claim 2, further comprising one or more sensors for obtaining data associated with the container, the one or more sensors comprising at least one of an optical sensor, a camera, a scanner, or a weight sensor.

5. The item manipulation device of claim 2, wherein the first or second engagement surface comprises a suction cup or a hook.

6. The item manipulation device of claim 2, further comprising:
   a first actuator configured to move the manipulation assembly along the first direction; and
   a second actuator configured to move the manipulation assembly along the second direction normal.

7. A method comprising,
   operating a manipulation assembly along a first direction from a starting position inside a container passage to engage a first engagement surface with a container;
   with the first engagement surface engaged with the container, operating the manipulation assembly along the first direction to move the container at least partially onto conveyance surfaces;
   with the container at least partially on the conveyance surfaces, moving the manipulation assembly in a second direction normal to the first direction, from a location inside the container passage through an opening between the conveyance surfaces to a position below the container passage;
   operating the conveyance surfaces to convey the container at least partially through the container passage;
   with the container at least partially on the conveyance surface, moving the manipulation assembly in the second direction from the position below the container passage through the opening to the location inside the container passage;
   with the manipulation assembly in the container passage, operating the manipulation assembly along the first direction to engage a second engagement surface with the container; and
   with the second engagement surface engaged with the container, moving the container at least partially off of the conveyance surface.

8. The method of claim 7, further comprising with the container on the conveyance surfaces, relocating a platform having the conveyance surfaces to a position for moving the container off of the conveyance surfaces.

9. The method of claim 7, wherein the container is moved at least partially off of the conveyance surfaces on a side of the conveyance surfaces where the container was moved at least partially onto the conveyance surfaces or the container is moved at least partially off of the conveyance surfaces on an opposing side of the conveyance surfaces to where the container was moved at least partially onto the conveyance surfaces.

10. The method of claim 7, further comprising prior to moving the manipulation assembly in the second direction from the position below the container passage through the opening to the location inside the container passage, moving the manipulation assembly along the first direction to a position underneath a space vacated by the container resulting from the operating of the conveyance surfaces.

* * * * *